(12) United States Patent
Bayramoglu

(10) Patent No.: US 11,281,329 B2
(45) Date of Patent: Mar. 22, 2022

(54) DEVICE FOR DETECTING TOUCH

(71) Applicant: Nihat Deniz Bayramoglu, Henderson, NV (US)

(72) Inventor: Nihat Deniz Bayramoglu, Henderson, NV (US)

(*) Notice: Subject to any disclaimer, the term of this patent is extended or adjusted under 35 U.S.C. 154(b) by 0 days.

(21) Appl. No.: 17/140,387

(22) Filed: Jan. 4, 2021

(65) Prior Publication Data

US 2021/0124459 A1 Apr. 29, 2021

Related U.S. Application Data

(63) Continuation of application No. 14/588,354, filed on Dec. 31, 2014, now abandoned.

(51) Int. Cl.
*G06F 3/041* (2006.01)
*G06F 3/044* (2006.01)

(52) U.S. Cl.
CPC ........ *G06F 3/04166* (2019.05); *G06F 3/0445* (2019.05); *G06F 3/0446* (2019.05); *G06F 3/04164* (2019.05); *G06F 2203/04111* (2013.01); *G06F 2203/04112* (2013.01)

(58) Field of Classification Search
CPC .................. G06F 3/044; G06F 2203/04103
See application file for complete search history.

(56) References Cited

U.S. PATENT DOCUMENTS

| | | | | |
|---|---|---|---|---|
| 2008/0157893 A1* | 7/2008 | Krah | ...................... | G06F 3/0446 331/177 R |
| 2008/0264699 A1* | 10/2008 | Chang | ................... | G06F 1/1692 178/18.01 |
| 2012/0013554 A1* | 1/2012 | Nam | ............................ | 345/173 |
| 2013/0106727 A1* | 5/2013 | Juan | ........................ | G06F 3/041 345/173 |
| 2015/0002444 A1* | 1/2015 | Brunet | ................ | G06F 3/04166 345/174 |

* cited by examiner

*Primary Examiner* — Priyank J Shah
(74) *Attorney, Agent, or Firm* — Bayramoglu Law Offices LLC

(57) ABSTRACT

The present invention is a touch detection panel that uses capacitance changes between electrodes and changes thereof to determine a position of touch. The touch panel can be used in commercial applications where using a finger, stylus, or other object is the desired method of interface with an electronic system. The touch panel includes conductive electrodes and conductive lines connecting the conductive electrodes. The conductive electrodes themselves can be made of opaque conductive material, substantially transparent conductive material, or transparent conductive material depending on the requirements of an application. One such material is a metal mesh. The Touch panel is connected to a controller that applies current and/or voltage to the touch panel and senses current and/or voltage from the touch panel to determine either single or multiple touch locations.

22 Claims, 12 Drawing Sheets

DEVICE FOR DETECTING TOUCH

CROSS REFERENCE TO RELATED APPLICATION

This application is the continuation application of U.S. application Ser. No. 14/588,354, filed on Dec. 31, 2014. The contents of the above application are incorporated by reference in their entirety.

BACKGROUND

Human-machine interface has long been studied and different methods have been developed to interface with machines. Entering characters on a keyboard is one way of entering information into a machine. Mice are also used to move a cursor on a screen and point to a certain area to enter information. Combination of keyboard and mice entries can be replaced by touch panels that are either overlaid or embedded on a display device or a mouse pad to enter information to a machine. Touch panels detect the object touching the surface of the touch panel and produce a signal that indicates the position of a touch. There are different touch technologies including resistive, capacitive, projected capacitive, acoustic, force and optical.

Currently the most popular technology is a projective capacitive technology due to its ability to provide multiple touches, meaning if several objects touch the touch panel the locations of all the objects can be determined either simultaneously or in a very short period of time from each other.

Multiple touch projective capacitive touch panels detect the change in current due to change in capacitance. When an electrode line of a capacitive touch panel is driven by a current source, all capacitances on those electrodes are charged. The charging time changes depending upon the number of electrodes and the resistance of the given line on a given axis. As the touch panel gets larger, an increasing number of electrodes are needed per axis to provide proper resolution. As the number of electrodes increases, the resistance increases therefore increasing the charging time. Increased charging time reduces the speed of the touch panel circuit.

SUMMARY OF THE INVENTION

One objective of the invention is to reduce the charging time on a given axis for a capacitive touch panel therefore increasing the response time.

Another object of the invention is to provide a touch panel with a better visual performance while reducing the resistance of electrodes.

Another object of the invention is to manufacture a touch panel wherein all electrodes with lower resistance are placed on the same layer of a substrate and self capacitances or mutual capacitances or the combination of both self capacitance and mutual capacitances are used to determine the location of a touch.

Another object of the invention is to build a touch panel wherein a plurality of capacitances on a surface are used to determine a single or multiple touch locations.

Another object of the invention is to provide a touch panel wherein as the size increases, regardless of the touch panel structure, the speed of the touch panel is kept at an acceptable level.

Another object of the invention is to provide a formula for designing a touch panel wherein proper variables are used to change the touch panel design that is sensitive to touches on its surface.

DETAILED DESCRIPTION OF EMBODIMENTS

Figure 1:
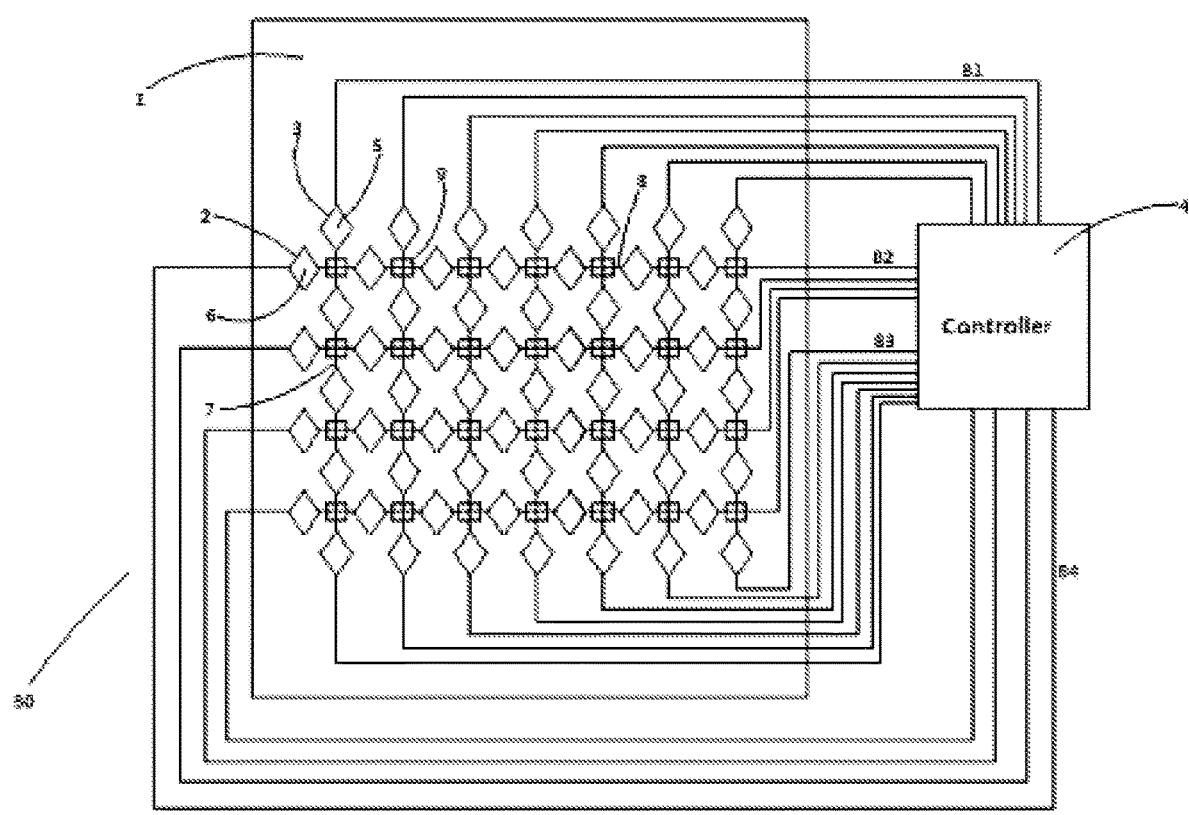
FIG. 1 shows a single layer projective capacitive touch panel using metal mesh

FIG. 1 shows touch panel 80 that has substrate 1. First conductive electrode assembly 2 built on substrate 1, second conductive assembly 3 built on substrate 1. First conductive assembly 2 contains a plurality of conductive electrodes 2 in a horizontal direction. A plurality of conductive electrodes 6 of first conductive electrode assembly 2 are connected to each other by conductive lines 8. There is a plurality of first conductive electrode assembly 2. Second conductive assembly 3 contains a plurality of conductive electrodes 5 in vertical direction. Conductive electrodes 5 of second conductive electrode assembly 3 are connected to each other by conductive lines 7. There is a plurality of second conductive electrode assembly 3. Plurality of first conductive assemblies 2 are connected to controller 4 by plurality of connecting wires 82 and 84. Likewise, a plurality of second conductive assemblies 3 are connected to controller 4 by plurality of connecting wires 81 and 83. Plurality of conductive lines 7 and plurality of conductive lines 8 are insulated from each other by using plurality of discrete insulators 9. Discrete insulators are made of material that do not conduct electricity. The material can be opaque or transparent.

Each conductive electrode 6 has a self capacitance between conductive electrode 6 and the ground. Likewise each conductive electrode 5 has a self capacitance between conductive electrode 5 and the ground. A self capacitance in this invention is defined as a capacitance between a conductor and the ground. A self capacitance depends on the size of the conductor and the permittivity of the conductor. It is also determined by the distance between the conductor and the ground. There also exists mutual capacitance between conductive electrode 6 and conductive electrode 5. Mutual capacitance is determined by three variables among other things. The distance between conductive electrode 5 and conductive electrode 6, the area between the conductive electrode 5 and conductive electrode 6 and the permittivity of the material used to build conductive electrode 5 and conductive electrode 6.

Touch panel 80 can detect touches on substrate 1 by using different techniques. In the first technique, controller 4 applies a current at a predetermined fundamental frequency to conductive assembly 3. The current is applied to one conductive assembly 3 at a time in sequence. While current is applied to one of the conductive assemblies 3 in the horizontal direction are sensed in a sequence. Once all the conductive assemblies 2 in horizontal direction are sensed, a current is applied to next conductive assembly 3 and then all conductive assemblies 2 are sensed in sequence. This process is repeated so that a map of capacitance distribution of touch panel 80 is calculated and stored in controller 4. This mapping of the touch panel is important because there are many stray capacitances caused by the touch panel structure and other neighboring structures. By mapping the touch panel 80, all the current capacitances captures while there is no touch on the surface. If a touch occurs, the capacitance at the point of touch will alter the capacitance at that point and as a result, the current sensed from that line will change. Controller 4 detects this change and determines the touch location based on this change.

An alternative method of increasing signal to noise ratio is to model touch panel 80 as a band pass filter (BPF). It has many self and mutual capacitances and conductive resistances built on the panel. When a current is applied to conductive assembly 3, certain amount of current will pass to conductive assembly 2 based on the filter characteristics. Therefore it is important to find the optimum frequency for the signal applied to touch panel 80 based on the filter characteristics. The filter characteristics can be best recognized by applying signals with different frequencies to touch panel 80 and measuring the output to determine the filter characteristics. This way, an amplitude versus frequency graph can be obtained and saved in the storage in controller 4 for each conductive assembly 3 and conductive assembly 2. By knowing these many curves, an optimum input frequency can be identified to provide the best signal to noise ratio. The system is adaptive in that during the normal operation of touch panel 80, a current with a certain frequency is applied to each conductive assembly 3. The frequency of the current applied to each individual conductive assembly in the vertical direction may be the same or similar or different based on the filter characteristic is obtained. When current is applied to one of the conductive assemblies 3, conductive assemblies 2 are sensed in a sequence. Alternatively a current with a certain frequency may be applied to each conductive assembly 2. The frequency of the current applied to each individual conductive assembly in the vertical direction may be the same or similar or different based on the filter characteristic is obtained. When current is applied to one of the conductive assemblies 2, conductive assemblies 3 are sensed in a sequence. By knowing the filter characteristics of touch panel 80, each conductive assembly is driven with a current with an optimum frequency based on the filter characteristics and therefore an optimum signal to noise ratio is obtained at the output of sensing conductive assemblies.

Figure 2:
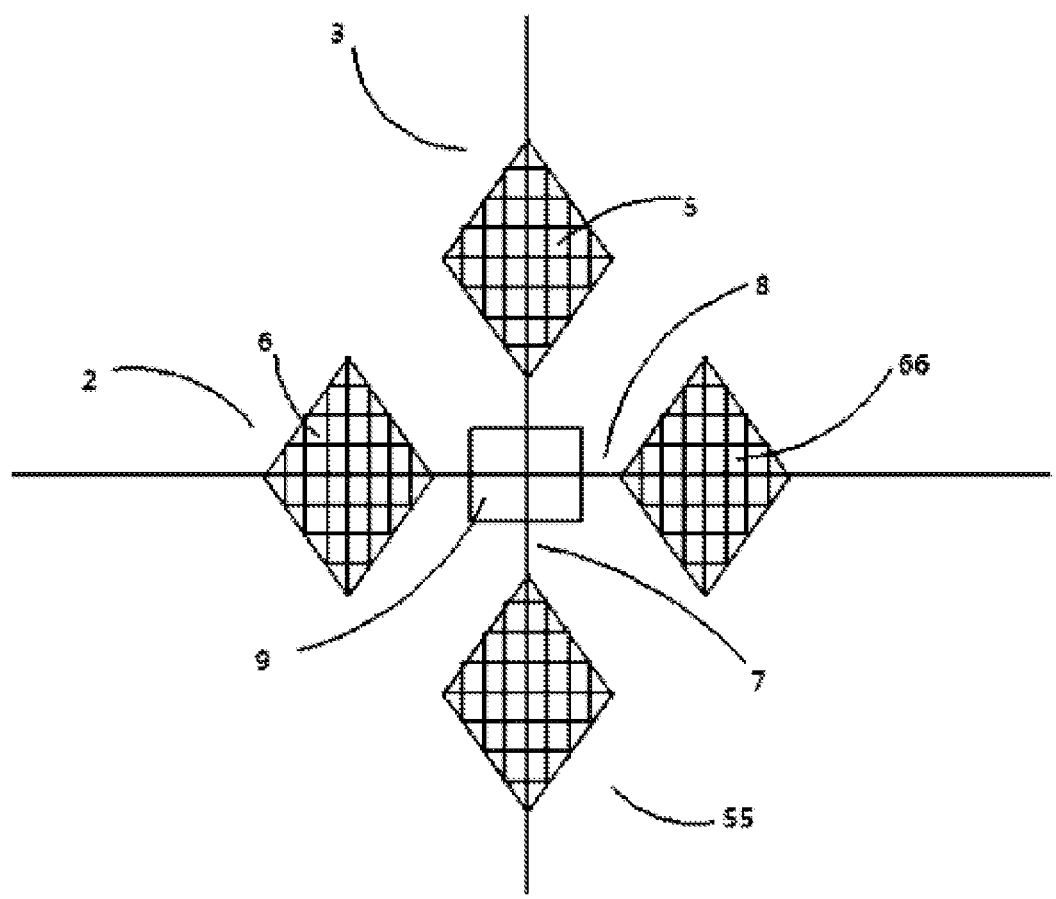
FIG. 2 shows four electrodes set up with metal mesh

FIG. 2 shows the detailed structure of four electrodes. Conductive electrodes 5 and 55 form second conductive electrode assembly 3. Conductive electrodes 6 and 66 form first conductive electrode assembly 2. Conductive line 7 connects conductive electrode 5 to conductive electrode 55. Conductive line 8 connects conductive electrode 6 to conductive electrode 66. Insulator 9 is placed between conductive line 7 and conductive line 8 and provides insulation so that conductive line 7 and conductive line 8 do not touch each other. In this embodiment, conductive electrodes 5, 55, 6, and 66 are built using metal mesh structure. Metal mesh is a structure where very thin metal lines in both horizontal and vertical direction are placed within each electrode such that horizontal and vertical metal lines touch each other. In this embodiment, conductive electrodes 5, 55, 6, and 66 are built using metal meshes while conductive line 7 is a single conductive line connecting conductive electrode 5 to conductive electrode 55. Conductive line 8 is a single conductive line connecting conductive electrode 6 to conductive electrode 66. In a different embodiment, conductive electrodes 5, 55, 6, and 66 can be solid metal or transparent conductive material replacing metal meshes.

Figure 3:
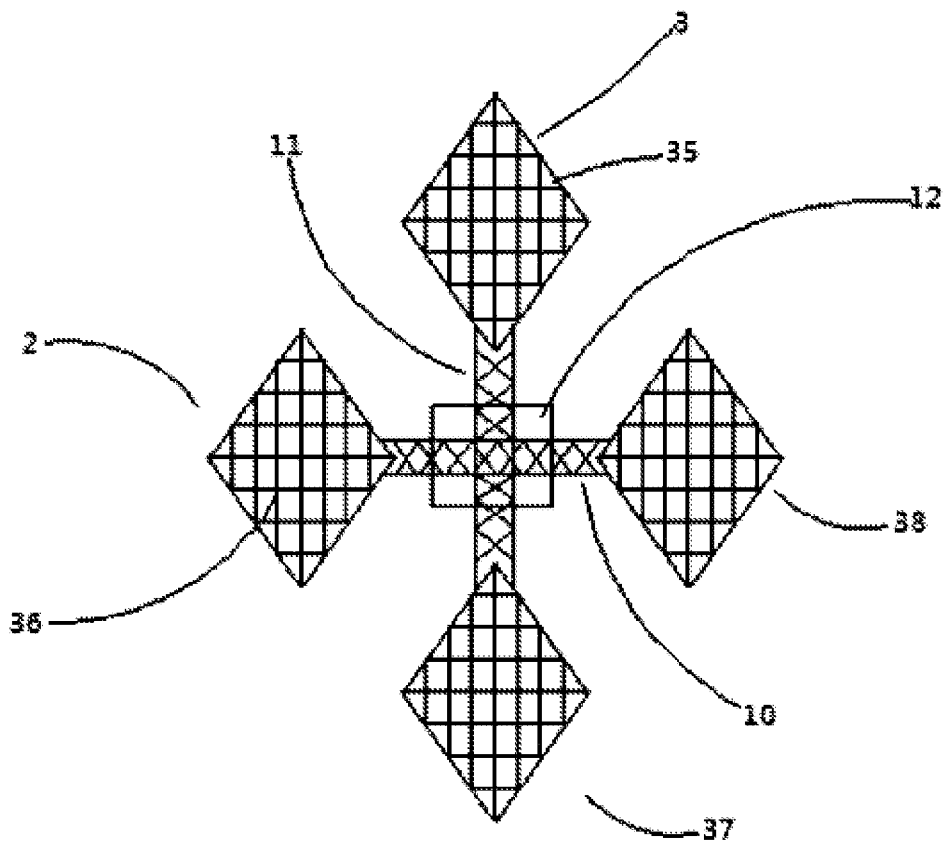
FIG. 3 shows four electrodes with a different embodiment

FIG. 3 shows another embodiment of this invention. In this embodiment, metal mesh is used to build conductive electrode 35, conductive electrode 37, conductive electrode 36, and conductive electrode 38. Conductive line 10 connects conductive electrode 36 to conductive electrode 38. Conductive line 10 in this embodiment is different from conductive line 8 in embodiment in FIG. 2 in that conductive line 10 is made of metal mesh while conductive line 8 is a single line. Conductive line 11 connects conductive electrode 35 to conductive electrode 37. Conductive line 11 in this embodiment is different than conductive line 7 in embodiment in FIG. 2 in that conductive line 11 is made of metal mesh while conductive line 7 is a single line. Insulator 12 is placed between conductive line 10 and conductive line 11 and insulates conductive line 10 from conductive line 11. In this embodiment, a single discrete insulator 12 is used to insulate conductive line 10 from conductive line 11. In an alternative embodiment, conductive electrodes 35, 37, 36, and 38 can be built using solid metal or solid transparent material while conductive line 10 and conductive line 11 can be built using metal mesh structure.

Metal mesh used in this invention can be any conductive metal including metal nanowires or micro wires.

Figure 4:
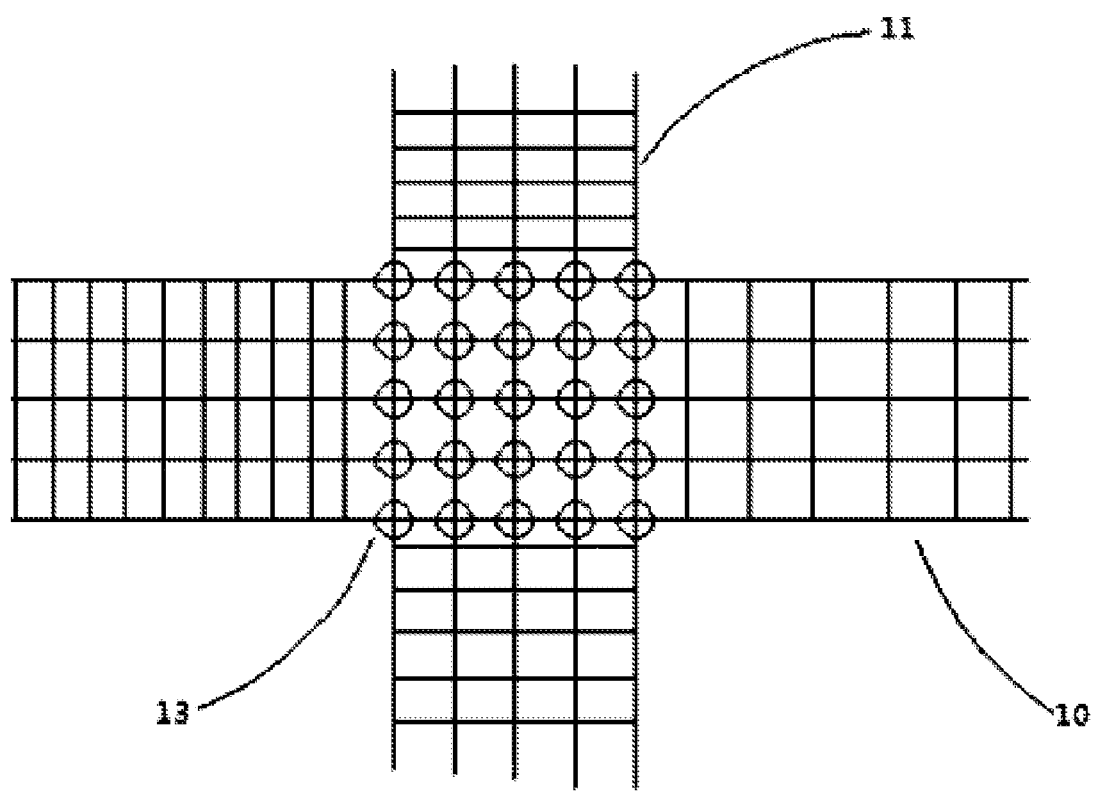
FIG. 4 shows an embodiment where discrete insulation is used

FIG. 4 shows another embodiment of this invention wherein a different insulation structure is used. Conductive line 10 and conductive line 11 are made of metal meshes. Metal meshes are built by placing vertical and horizontal metal lines on a substrate and after the process, patterning these metal meshes to form conductive electrodes and conductive lines as shown in FIG. 3 and FIG. 4. When conductive lines 10 and 11 cross each other, a connection will be made between individual metal mesh lines unless they are insulated from each other. Here, each metal mesh line has discrete insulator 13. Plurality of discrete insulators 13 are used to insulate each metal mesh line in conductive line 11 from each metal mesh line in conductive line 10. The size and shape of discrete insulator 13 can be chosen to provide insulation between metal mesh lines. Insulator 13 can be built using transparent or opaque material. Metal mesh line size can be between 1 nanometer and 100 micrometer. Preferably between 1 nm and 100 nanometer. The size of conductive line 10 and conductive line 11 may be between 10 nm and 1 mm.

Figure 5:
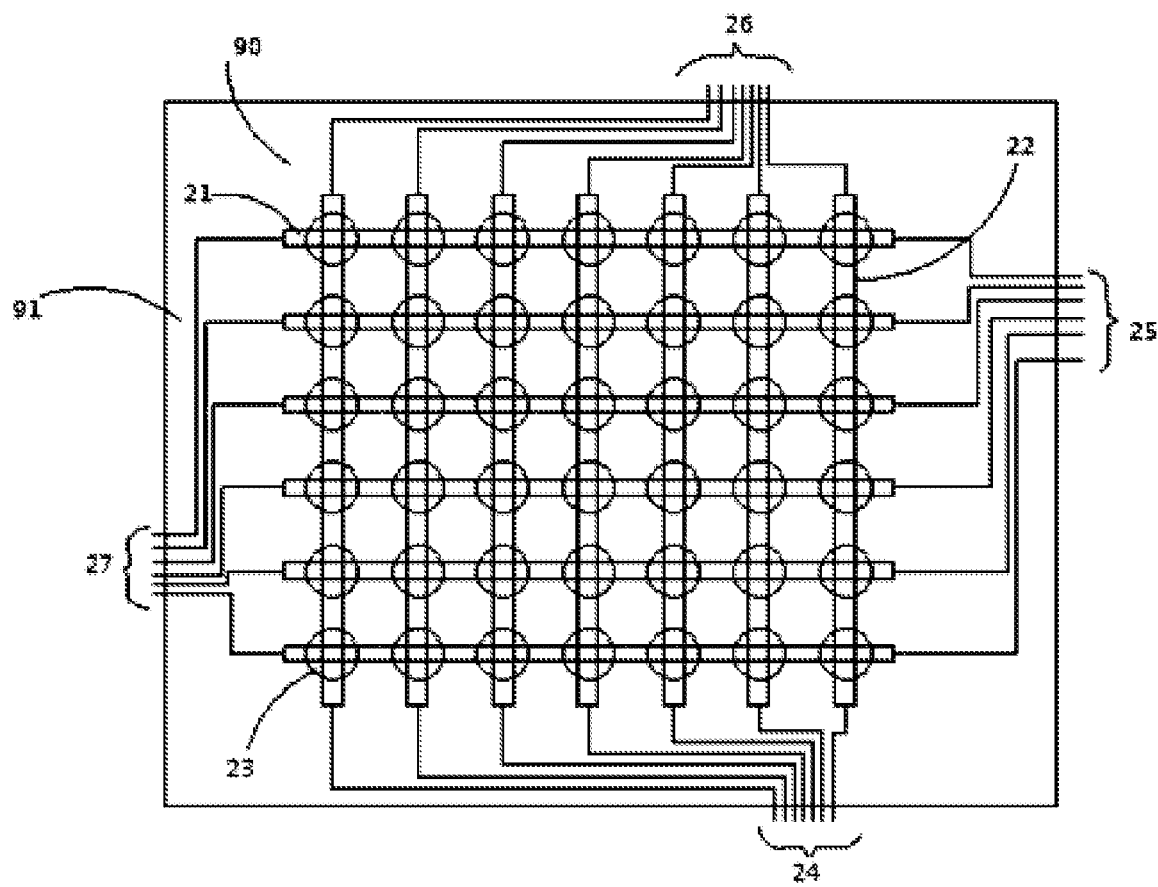
FIG. 5 shows a single layer touch panel using elongated electrodes
Figure 6:
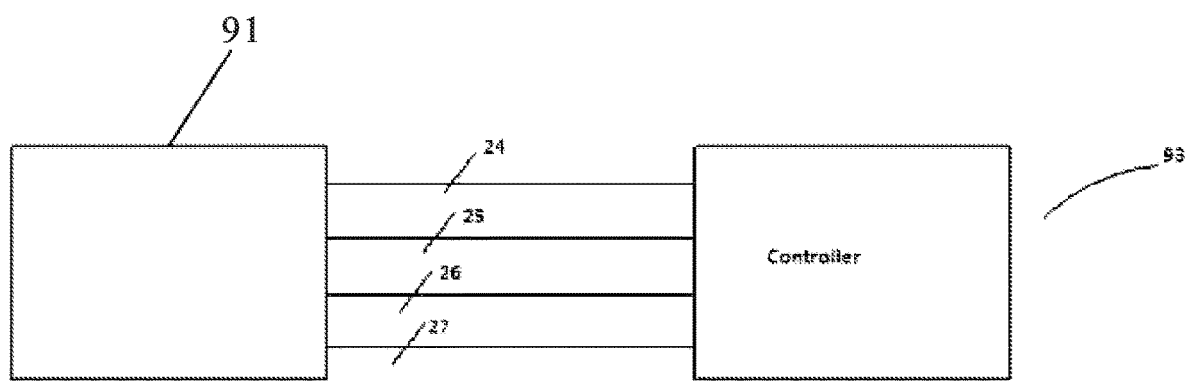
FIG. 6 shows a touch panel being connected to a controller

FIG. 5 shows another embodiment of the invention. In this embodiment, touch panel 91 includes conductive lines 21 in horizontal direction and conductive lines 22 in vertical direction. Both conductive lines 21 and conductive lines 22 are placed on the same side of substrate 90. A plurality of discrete insulators 23 are placed between conductive lines 21 and conductive lines 22 such that conductive lines 21 do not make contact with conductive lines 22. The shape and size of discrete insulator 23 can be adjusted based on the touch panel size and the sizes of conductive lines 21 and conductive lines 22. Conductive lines 21 are connected to controller 93 by using plurality of first conductive lines 24, second conductive lines 25, third conductive lines 26 and fourth conductive lines 27. While FIG. 5 shows first conductive lines 24 at the right bottom of touch panel 91, first conductive lines 24 can be placed anywhere on touch panel 91. While FIG. 5 shows second conductive lines 25 at the right top of touch panel 91, second conductive lines 25 can be placed anywhere on touch panel 91. While FIG. 5 shows third conductive lines 26 at the right top of touch panel 91, third conductive lines 26 can be placed anywhere on touch panel 91. While FIG. 5 shows fourth conductive lines 27 at the left bottom of touch panel 91, fourth conductive lines 24 can be placed anywhere on touch panel 91. First conductive lines 24, second conductive lines 25, third conductive lines 26, and fourth conductive lines 27 can be all placed in the same area of touch panel 91.

Figure 7:
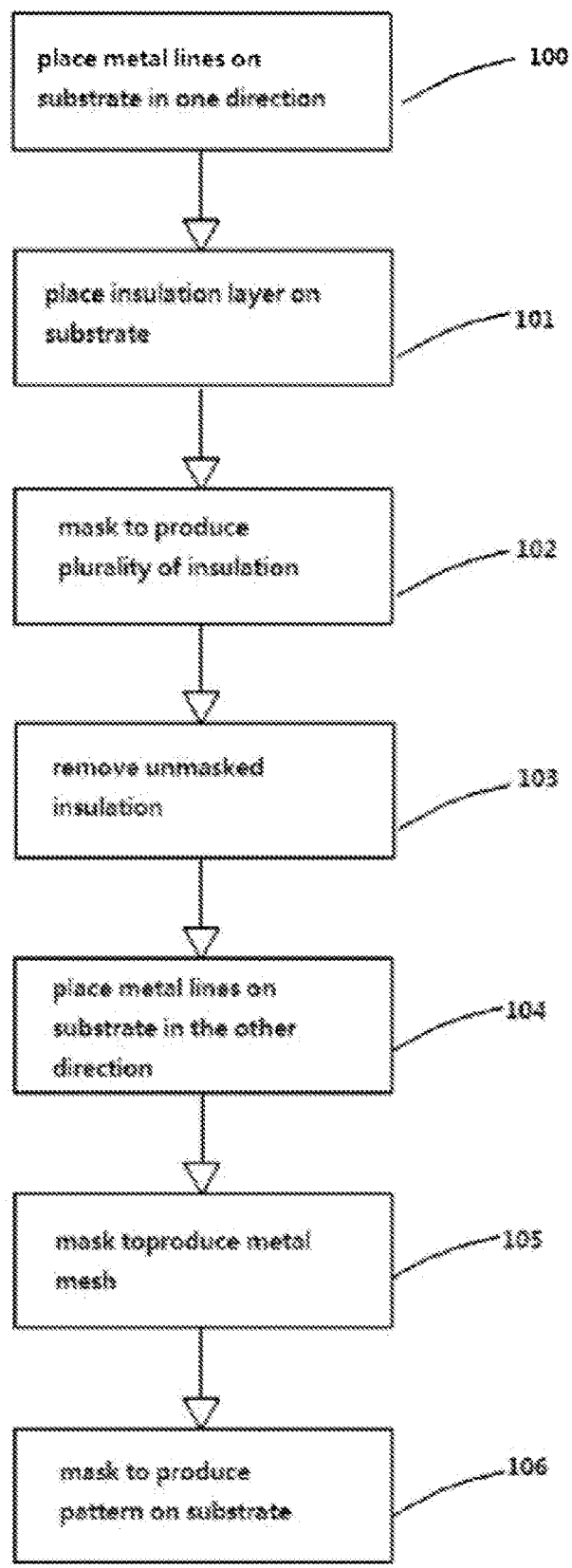
FIG. 7 shows the process of making the touch panel

FIG. 7 shows the process of making a touch panel using metal meshes. The process can be used for any embodiment explained above. In step 100, metal lines are placed on a substrate in the first direction. In step 101 an insulation layer is placed over the substrate. In step 102, a mask is placed on insulation layer. In step 103, unmasked insulation is removed such that discrete insulators stay only in the areas where insulation is desired. In step 104, metal lines are placed on the substrate in the second direction. The second direction is substantially perpendicular to the first direction. After step 104, the substrate has metal lines in the first direction and in the second direction and they are insulated from each other as shown in FIG. 3 or FIG. 4. In step 105 and 106, a mask is used to produce a pattern on the substrate.

Figure 8:
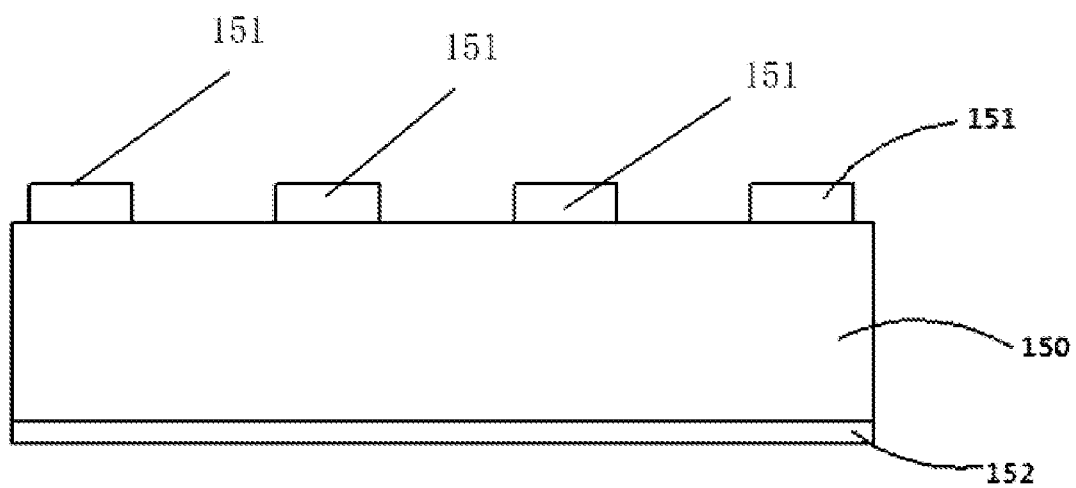
FIG. 8 shows cross section of a dual layer touch panel

FIG. 8 shows the cross sectional view of an embodiment wherein conductive electrode assemblies 151 are placed on one surface of substrate 150. Conductive electrode assemblies 152 are placed on the other surface of substrate 150. Substrate 150 is made of an insulating material such that conductive electrode assemblies 151 and conductive electrode assemblies 152 are insulated from each other. Conductive electrode assemblies 151 and conductive electrode assemblies 152 can be built using metal mesh material or solid metal or transparent conductive material.

Figure 9:
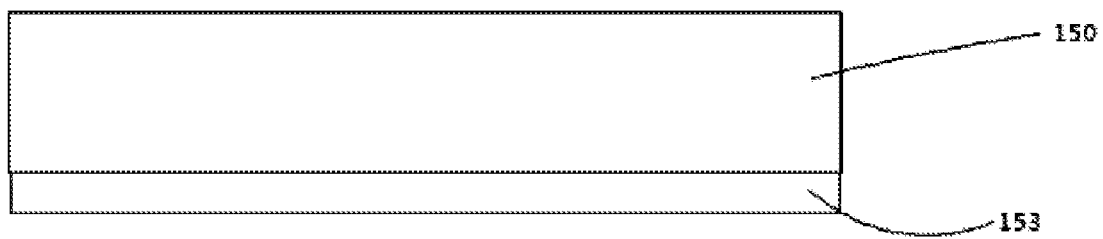
FIG. 9 shows cross section of a single layer touch panel

FIG. 9 shows the cross sectional view of another embodiment wherein touch circuit 153 is placed on one side of substrate 150. This is a single layer structure. For example substrate 150 may be a cover glass for a device and touch circuit 153 may be placed on one surface of cover glass 150. Cover glass 150 can be a chemically strengthened or tempered glass. Cover glass 150 can be either a flat cover glass or a curved cover glass. Touch circuit 153 includes conductive electrode assemblies 2, conductive electrode assemblies 3, conductive lines 7, conductive lines 8, insulators 9, conductive lines 81, 82, 83 and 84 as shown in FIG. 1. In this embodiment, conductive electrode assemblies 2 and conductive electrode assemblies 3 can be built of transparent or opaque material. Conductive lines 7 and conductive lines 8 are built using transparent material. Conductive lines 81, 82, 83 and 84 can be made of transparent or opaque material.

Figure 10:
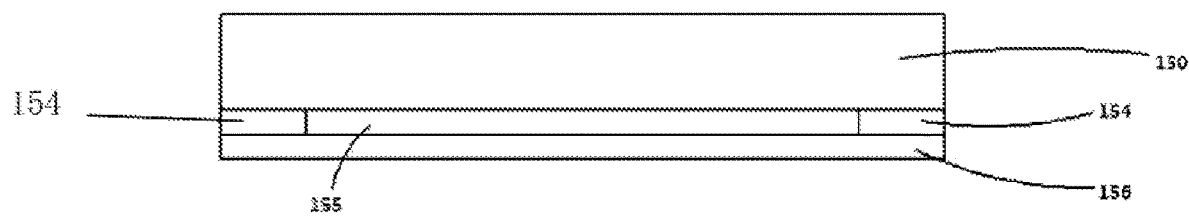
FIG. 10 shows cross section of a single layer touch panel

FIG. 10 shows the cross sectional view of another embodiment wherein black mask 154 is placed on a surface of substrate 150 such that it is placed in the periphery region of substrate 150. Supporting layer 155 is placed on the same surface as black mask 154. Touch circuit 156 is placed on supporting layer 155 and black mask 154. Touch circuit 156 includes conductive electrode assemblies 2, conductive electrode assemblies 3, conductive lines 7, conductive lines 8, insulators 9, conductive lines 81, 82, 83 and 84 as shown in FIG. 1. In this embodiment, conductive electrode assemblies 2 and conductive electrode assemblies 3 can be built of transparent or opaque material. Conductive lines 7 and conductive lines 8 are built using transparent material. Conductive lines 81, 82, 83 and 84 can be made of transparent or opaque material. Conductive lines of FIG. 1 are usually made of metal lines but alternatively can be made of transparent conductive material. If conductive lines 81, 82, 83 and 84 are made of metal, and these lines are large enough then they will be visible to the naked eye. Therefore connecting lines 81, 82, 83 and 84 are placed under black mask 154 such that connecting lines cannot be visible to a user.

Figure 11:
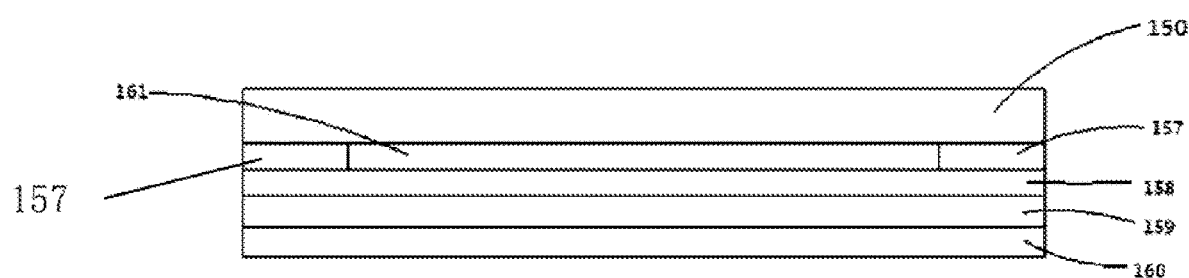
FIG. 11 shows cross section of a dual layer touch panel

FIG. 11 shows the cross sectional view of another embodiment wherein black mask 157 is placed on a surface of substrate 150 such that it is placed in the periphery region of substrate 150. Supporting layer 161 is placed on the same surface as black mask 157. Touch circuit 158 is placed on supporting layer 155 and black mask 154. Insulating layer 159 is placed on touch circuit 158. Another touch circuit 160 is placed on insulating layer 159. Touch circuit 158 includes conductive electrode assemblies 2 and connection lines 82 and 84 as shown in FIG. 1. Touch circuit 160 includes conductive electrode assemblies 3 and connection lines 81 and 83. Connecting lines 81, 82, 83 and 84 are usually made of metal lines. If the size of these lines are large enough then they may be visible to the naked eye. Therefore connecting lines 81, 82, 83 and 84 are placed under black mask 157 such that connecting lines cannot be visible.

Figure 12:
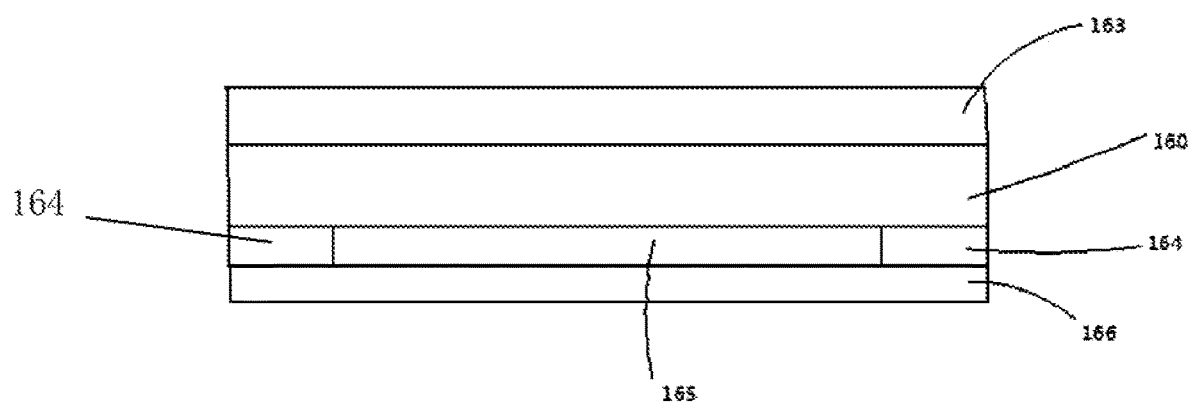
FIG. 12 shows cross section of a single layer touch panel

FIG. 12 shows the cross sectional view of another embodiment wherein black mask 164 is placed on a surface of substrate 160 such that it is placed in the periphery region of substrate 160. Supporting layer 165 is placed on the same surface as black mask 164. Touch circuit 166 is placed on supporting layer 165 and black mask 164. Touch circuit 166 includes conductive electrodes, assemblies 2, conductive assemblies 3, conductive lines 7, conductive lines 8 and connecting lines 82 and 84 of FIG. 1. Connecting lines 82 and 84 of FIG. 1 are usually made of metal lines. If the size of these lines are large enough they will be visible. Therefore connecting lines are placed under black mask 164 such that connecting lines cannot be visible. An antireflective coating 163 is placed on the other surface of substrate 150. In an alternative embodiment, the antireflective coating 163 can be placed between substrate 160 and supporting layer 165.

What is claimed is:

1. A touch panel comprising:
   a substrate;
   a plurality of first conductive assemblies placed on a surface of the substrate in a first direction;
   a plurality of second conductive assemblies placed on the surface of the substrate in a second direction;
   wherein the first direction is substantially perpendicular to the second direction;
   wherein each first conductive assembly comprises a plurality of first conductive electrodes and a plurality of first conductive lines connecting the plurality of first conductive electrodes;
   wherein each second conductive assembly comprises a plurality of second conductive electrodes and a plurality of second conductive lines connecting the plurality of second conductive electrodes;
   wherein the plurality of first conductive lines having rectangular shape and the plurality of second conductive lines having rectangular shape;
   a plurality of insulators placed between the plurality of first conductive lines and plurality of second conductive lines, wherein if the plurality of first conductive lines and the plurality of second conductive lines are made of metal mesh, then the plurality of insulators are used between individual metal lines in the first direction and individual metal lines in the second direction;

wherein a controller applies an alternating current at a predetermined frequency to the plurality of second conductive assemblies or to the plurality of first conductive assemblies;
wherein the touch panel is modeled as a band pass filter, and the frequency of the alternating current is determined based on filter characteristics of the band pass filter;
wherein the controller senses the current from the plurality of first conductive assemblies if the current is applied to the plurality of second conductive assemblies;
wherein the controller senses the current from the plurality of second conductive assemblies if the current is applied to the plurality of first conductive assemblies;
wherein a first map containing either voltage or current or capacitance values at different locations on the surface of the touch panel is generated when there is no touch on the surface of the touch panel, and when there is a touch on the touch panel a second map is generated containing either voltage or current or capacitance values at similar locations as in the first map, and the second map and the first map are compared to determine the touch location on the surface of the touch panel.

2. The touch panel of claim 1, wherein the frequency of the alternating current is determined by using the distance between the first conductive electrodes and the second conductive electrodes, the resistance of the conductive material used to build the first conductive electrodes and the second conductive electrodes, the area between the first conductive electrodes and the second conductive electrodes and the permeability of the material used to build the first conductive electrodes and the second conductive electrodes.

3. The touch panel of claim 2, wherein the first group of conductive electrodes are made of a material that is selected from a group consisting of transparent material, opaque material and metal mesh.

4. The touch panel of claim 3, wherein the plurality of first conductive lines and the plurality of second conductive lines are made of a material that is selected from a group consisting of transparent material, opaque material and metal mesh.

5. The touch panel of claim 1, wherein the substrate is made of a transparent material.

6. The touch panel of claim 5, wherein the second group of conductive electrodes are made of a material that is selected from a group consisting of transparent material, opaque material and metal mesh.

7. The touch panel of claim 1 wherein the alternating current is applied to the first group of conductive assemblies in a sequential manner and the output of the second group of conductive assemblies are measured sequentially such that when a current is applied to a first conductive electrode assembly of the first group of conducive electrode assemblies, the output of each conductive electrode assembly of the second group of conductive electrode assemblies is measured in a sequential manner, and for the current applied to each conductive electrode assembly of the first group of conductive electrode assemblies, the outputs of the second group of conductive electrode assemblies are measured sequentially; wherein any change in output of the second group of conductive electrode assemblies corresponds to a touch, wherein the touch is located between a conductive electrode of the first group of conductive electrode assemblies and a conductive electrode of the second group of conductive electrode assemblies.

8. A touch panel comprising:
a substrate;
a plurality of first conductive assemblies placed on a surface of the substrate in a first direction;
a plurality of second conductive assemblies placed on a separate surface of the substrate in a second direction;
wherein the first direction is substantially perpendicular to the second direction;
wherein each first conductive assembly comprises a plurality of first conductive electrodes and a plurality of first conductive lines connecting the plurality of first conductive electrodes;
wherein each second conductive assembly comprises a plurality of second conductive electrodes and a plurality of second conductive lines connecting the plurality of second conductive electrodes;
wherein the plurality of first conductive lines having rectangular shape and the plurality of second conductive lines having rectangular shape;
a plurality of insulators placed between the plurality of first conductive lines and plurality of second conductive lines, wherein if the plurality of first conductive lines and the plurality of second conductive lines are made of metal mesh, then the plurality of insulators are used between individual metal lines in the first direction and individual metal lines in the second direction
wherein a controller applies an alternating current having a predetermined frequency to the plurality of second conductive assemblies or to the plurality of first conductive assemblies;
wherein the controller senses the current from the plurality of first conductive assemblies if the current is applied to the plurality of second conductive assemblies;
wherein the controller senses the current from the plurality of second conductive assemblies if the current is applied to the plurality of first conductive assemblies;
wherein a first map containing either voltage or current or capacitance values at different locations on the surface of the touch panel is generated when there is no touch on the surface of the touch panel, and when there is a touch on the touch panel a second map is generated containing either voltage or current or capacitance values at similar locations as in the first map, and the second map and the first map are compared to determine the touch location on the surface of the touch panel;
wherein the frequency of the alternating current is determined by using the distance between the first conductive electrodes and the second conductive electrodes, the area between the first conductive electrodes and the second conductive electrodes, the area between the first conductive lines and the second conductive lines, the resistance of the conductive material used to build the first conductive electrodes, the resistance of the conductive material used to build the second conductive electrodes, the resistance of the conductive material used to build the first conductive lines, the resistance of the conductive material used to build the second conductive lines, and the permittivity of the material used to build the first conductive electrodes and the second conductive electrodes.

9. The touch panel of claim 8, wherein the substrate is made of a transparent material.

10. The touch panel of claim 9 wherein the plurality of first conductive lines and the plurality of second conductive lines are made of a material that is selected from a group consisting of transparent material, opaque material and metal mesh.

11. The touch panel of claim 8, wherein the first group of conductive electrodes are made of a material that is selected from a group consisting of transparent material, opaque material and metal mesh.

12. The touch panel of claim 8, wherein the second group of conductive electrodes are made of a material that is selected from a group consisting of transparent material, opaque material and metal mesh.

13. The touch panel of claim 8, wherein the alternating current is applied to the first group of conductive assemblies in a sequential manner and the output of the second group of conductive electrodes are measured sequentially such that when a current is applied to a first conductive assembly of the first group of conductive assemblies, the output of each conductive assembly of the second group of electrodes is measured in a sequential manner, and for the current applied to each conductive electrode of the first group of conductive electrodes, the outputs of the second group of electrodes are measured in sequentially; wherein any change in output of the second group of conductive electrodes corresponds to a touch, wherein the touch is located between a conductive electrode of the first group of conductive electrodes and a conductive electrode of the second group of conductive electrodes.

14. A touch panel comprising:
a substrate;
a touch circuit placed on a surface of the substrate; the touch circuit comprising: plurality of first conductive assemblies placed on a surface of the substrate in a first direction;
a plurality of second conductive assemblies placed on the surface of the substrate in a second direction;
wherein the first direction is substantially perpendicular to the second direction;
wherein each first conductive assembly comprises a plurality of first conductive electrodes and a plurality of first conductive lines connecting the plurality of first conductive electrodes;
wherein each second conductive assembly comprises a plurality of second conductive electrodes and a plurality of second conductive lines connecting the plurality of second conductive electrodes;
wherein the plurality of first conductive lines having rectangular shape and the plurality of second conductive lines having rectangular shape;
wherein a controller applies an alternating current at a predetermined frequency to the plurality of second conductive assemblies or to the plurality of first conductive assemblies;
wherein the touch panel is modeled as a band pass filter, and the frequency of the alternating current is determined based on filter characteristics of the band pass filter;
a plurality of insulators placed between the plurality of first conductive lines and plurality of second conductive lines, wherein if the plurality of first conductive lines and the plurality of second conductive lines are made of metal mesh, then the plurality of insulators are used between individual metal lines in the first direction and individual metal lines in the second direction;
wherein a first map containing either voltage or current or capacitance values at different locations on the surface of the touch panel is generated when there is no touch on the surface of the touch panel, and when there is a touch on the touch panel a second map is generated containing either voltage or current or capacitance values at similar locations as in the first map, and the second map and the first map are compared to determine the touch location on the surface of the touch panel.

15. The touch panel of claim 14 wherein a controller applies an alternating current at a predetermined frequency to the plurality of second conductive assemblies or to the plurality of first conductive assemblies; and wherein the controller senses the current from the plurality of first conductive assemblies if the current is applied to the plurality of second conductive assemblies.

16. The touch panel of claim 15, wherein the frequency of the alternating current is determined based on filter characteristics of each conductive electrode assembly.

17. The touch panel of claim 16 wherein the plurality of first conductive lines and the plurality of second conductive lines are made of a material that is selected from a group consisting of transparent material, opaque material and metal mesh.

18. The touch panel of claim 15, wherein the second group of conductive electrodes are made of a material that is selected from a group consisting of transparent material, opaque material and metal mesh.

19. The touch panel of claim 14, wherein the substrate is made of a transparent material.

20. The touch panel of claim 14, wherein the first group of conductive electrodes are made of a material that is selected from a group of conductive electrodes are made of a material that is selected from a group consisting of transparent material, opaque material and metal mesh.

21. The touch panel of claim 14 wherein the alternating current is applied to the first group of conductive assemblies in a sequential manner and the output of the second group of conductive assemblies are measured sequentially such that when a current is applied to a first conductive electrode assembly of the first group of conductive electrode assemblies, the output of each conductive electrode assembly of the second group of conductive electrode assemblies is measured in a sequential manner, and for the current applied to each conductive electrode assembly of the first group of conductive electrode assemblies, the outputs of the second group of conductive electrode assemblies are measured sequentially; wherein any change in output of the second group of conductive electrode assemblies corresponds to a touch, wherein the touch is located between a conductive electrode of the first group of conductive electrode assemblies and a conductive electrode of the second group of conductive electrode assemblies.

22. The touch panel of claim 14, wherein a black mask is placed at the periphery of the same surface as the touch circuit.

* * * * *